US012587475B2

(12) United States Patent
Arrobo Vidal et al.

(10) Patent No.: US 12,587,475 B2
(45) Date of Patent: Mar. 24, 2026

(54) INFORMATION CENTRIC NETWORK ROUTING

(71) Applicant: Intel Corporation, Santa Clara, CA (US)

(72) Inventors: Gabriel Arrobo Vidal, Hillsboro, OR (US); Maria Ramirez Loaiza, Beaverton, OR (US); Zongrui Ding, Portland, OR (US); Qian Li, Beaverton, OR (US); Geng Wu, Portland, OR (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 17/855,187

(22) Filed: Jun. 30, 2022

(65) Prior Publication Data

US 2022/0337519 A1     Oct. 20, 2022

(51) Int. Cl.
*H04L 45/00* (2022.01)

(52) U.S. Cl.
CPC .................................... *H04L 45/66* (2013.01)

(58) Field of Classification Search
CPC ...................................................... H04L 45/66
See application file for complete search history.

(56) References Cited

U.S. PATENT DOCUMENTS

| | | | | |
|---|---|---|---|---|
| 2016/0191257 A1* | 6/2016 | Garcia-Luna-Aceves | ................... H04L 45/122 | |
| | | | 370/390 | |
| 2017/0142226 A1* | 5/2017 | De Foy | ................. H04L 67/104 | |
| 2017/0317933 A1* | 11/2017 | Oran | ..................... H04L 47/125 | |
| 2018/0302323 A1* | 10/2018 | Moiseenko | ............. H04L 67/63 | |
| 2022/0116315 A1* | 4/2022 | Zhang | ..................... H04L 43/12 | |
| 2022/0368625 A1* | 11/2022 | Smith | ..................... H04L 45/24 | |
| 2023/0198889 A1* | 6/2023 | Yerrapureddy | ......... H04L 45/24 | |
| | | | 370/235 | |

OTHER PUBLICATIONS

"IS-IS TLV Codepoints", [online]. [retrieved Jun. 16, 2020]. Retrieved from the Internet URL https www.iana.org assignments isis-tiv-codepoints isis-tiv-codepoints.xhtml, created May 6, 2003 updated Jun. 17, 2020, 12 pgs.
"NDN Packet Format Specification 0.3 documentation", [Online]. Retrieved from the Internet URL https docs.named-data.net NDN-packet-spec current types.html, updated Feb. 1, 2024, 4 pgs.

(Continued)

*Primary Examiner* — Donald L Mills

(74) *Attorney, Agent, or Firm* — Schwegman Lundberg & Woessner, P.A.

(57) ABSTRACT

System and techniques for Information Centric Network (ICN) routing are described herein. An ICN node receives a routing packet—which is a link layer packet corresponding to a link of the ICN node—that includes an ICN name and a routing metric. An entry for the link and name is created or updated and then sorted into a local routing data store based on the routing metric. Then, an interest packet for the ICN name is routed via the link based on the entry having a highest rank in the local routing data store.

24 Claims, 20 Drawing Sheets

OCTETS

| | |
|---|---|
| INTRADOMAIN ROUTING PROTOCOL DISCRIMINATOR | 1 |
| LENGTH INDICATOR | 1 |
| VERSION/PROTOCOL ID EXTENSION | 1 |
| ID LENGTH | 1 |
| R R R    PDU TYPE | 1 |
| VERSION | 1 |
| RESERVED | 1 |
| MAXIMUM AREA ADDRESS | 1 |
| ADDITIONAL HEADER FIELDS | 1 |
| TLV FIELDS | VARIABLE |

(56) References Cited

OTHER PUBLICATIONS

"Intermediate System to Intermediate System intra-domain routeing information exchange protocol for use in conjunction with the protocol for providing the connectionless-mode network service", ISO IEC 105892002, [Online]. Retrieved from the Internet URL http www.iso.org cms render live en sites isoorg contents data standard 03 09 30932. html, Jul. 11, 2019, 210 pages.

"Protocol identification in the network layer", ISO IEC TR 95771999, [Online]. Retrieved from the Internet URL http www.iso.org cms render live en sites isoorg contents data standard 03 10 31053.html, Dec. 1999, 26 pages.

"Open Shortest Path First v3 OSPFv3 Parameters", [Online]. Retrieved from the Internet URL https www.iana.org assignments ospfv3-parameters ospfv3-parameters.xhtml, 2019, 8 pgs.

Berger, L., "The OSPF Opaque LSA Option", [Online]. Retrieved from the Internet URL https tools.ietf.org html rfc5250, Jul. 2008, 17 pgs.

Callon, R. W., "Use of OSI IS-IS for routing in TCP IP and dual environments", RFC Editor, RFC1195, Dec. 1990, 85 pgs.

Ferguson, D., "OSPF for IPV6", [Online]. Retrieved from the Internet URL https tools.ietf.org html rfc5340, Jul. 2008, 94 pgs.

Lehman, Vince, "An experimental investigation of hyperbolic routing with a smart forwarding plane in NDN", 2016 IEEE Acm 24th International Symposium on Quality of Service IWQoS,, 2016, 10 pgs.

Li, T., "IS-IS Extensions for Traffic Engineering", RFC Editor, RFC5305, Oct. 2008, 17 pgs.

Lindem, A., "Support of Address Families in OSPFV3", [Online]. Retrieved from the Internet URL https tools.ietf.org html rfc5838, Apr. 2010, 13 pgs.

Moy, J., "OSPF Version 2", Network Working Group Request for Comments 2328, Apr. 1998, 245 pgs.

Smit, H., "Domain-Wide Prefix Distribution with Two-Level IS-IS", [Online]. Retrieved from the Internet URL https tools.ietf.org html rfc5302, Jul. 29, 2019, 16 pgs.

Wang, L., "OSPFN An OSPF Based Routing Protocol for Named Data Networking", NDN Tech. Rep., p. 15,, Jul. 2012, 15 pgs.

Wang, Lan, "A Secure Link State Routing Protocol for NDN", IEEE Access, vol. 6, pp. 10470-10482, 2018, 13 pgs.

Yi, C., "On the role of routing in named data networking", Proceedings of the 1st ACM Conference on Information-Centric Networking, New York, NY, USA, pp. 27-36, Sep. 2014, 10 pgs.

Zhang, M., "Scalable name-based data synchronization for named data networking", IEEE Conference on Computer Communications, pp. 1-9, May 2017, 9 pgs.

Zhu, Z., Lets ChronoSync Decentralized dataset state synchronization in Named DataInternational Conference on Network Protocols ICNP, pp. 1-10., Oct. 2013, 10 pages.

* cited by examiner

OCTETS

| | |
|---|---|
| INTRADOMAIN ROUTING PROTOCOL DISCRIMINATOR | 1 |
| LENGTH INDICATOR | 1 |
| VERSION/PROTOCOL ID EXTENSION | 1 |
| ID LENGTH | 1 |
| R R R PDU TYPE | 1 |
| VERSION | 1 |
| RESERVED | 1 |
| MAXIMUM AREA ADDRESS | 1 |
| ADDITIONAL HEADER FIELDS | 1 |
| TLV FIELDS | VARIABLE |

FIG. 2

| |
|---|
| ICN PREFIXES (TYPE =70) |
| ICN PREFIXES (LENGTH) |
| ICN PREFIX 1 (TLV) |
| ICN PREFIX 2 (TLV) |
| ICN PREFIX 3 (TLV) |
| ICN PREFIX N (TLV) |

FIG. 3

OCTETS

| | | | |
|---|---|---|---|
| ICN PREFIX I (TYPE = 1) | | | 1 |
| ICN PREFIX I (LENGTH) | | | 2 |
| 0 | I/E | DEFAULT METRIC | 1 |
| S | I/E | DELAY METRIC | 1 |
| S | I/E | EXPENSE METRIC | 1 |
| S | I/E | ERROR METRIC | 1 |
| ICN PREFIX/NAME | | | VARIABLE |

FIG. 4

OCTETS

| ICN PREFIX I (TYPE = 1) | | | 1 |
|---|---|---|---|
| ICN PREFIX I (LENGTH) | | | 2 |
| 0 | I/E | DEFAULT METRIC | 1 |
| S | I/E | DELAY METRIC | 1 |
| S | I/E | EXPENSE METRIC | 1 |
| S | I/E | ERROR METRIC | 1 |
| ICN PREFIX/NAME | | | VARIABLE |

| 0 | I/E | DEFAULT METRIC | 1 |
|---|---|---|---|
| S | I/E | DELAY METRIC | 1 |
| S | I/E | EXPENSE METRIC | 1 |
| S | I/E | ERROR METRIC | 1 |
| ICN PREFIX/NAME | | | VARIABLE |

FIG. 5

| |
|---|
| ICN PREFIXES (TYPE =72) |
| ICN PREFIXES (LENGTH) |
| ICN PREFIX 1 (TLV) |
| ICN PREFIX 2 (TLV) |
| ICN PREFIX 3 (TLV) |
| |
| ICN PREFIX N (TLV) |

FIG. 6

OCTETS

| | |
|---|---|
| PROTOCOL SUPPORTED (TYPE = 129) | 1 |
| PROTOCOL SUPPORTED | 1 |
| NLPID VALUE 1 | 1 |
| ⋮ | |
| NLPID VALUE N | 1 |

FIG. 7

Figure 13:
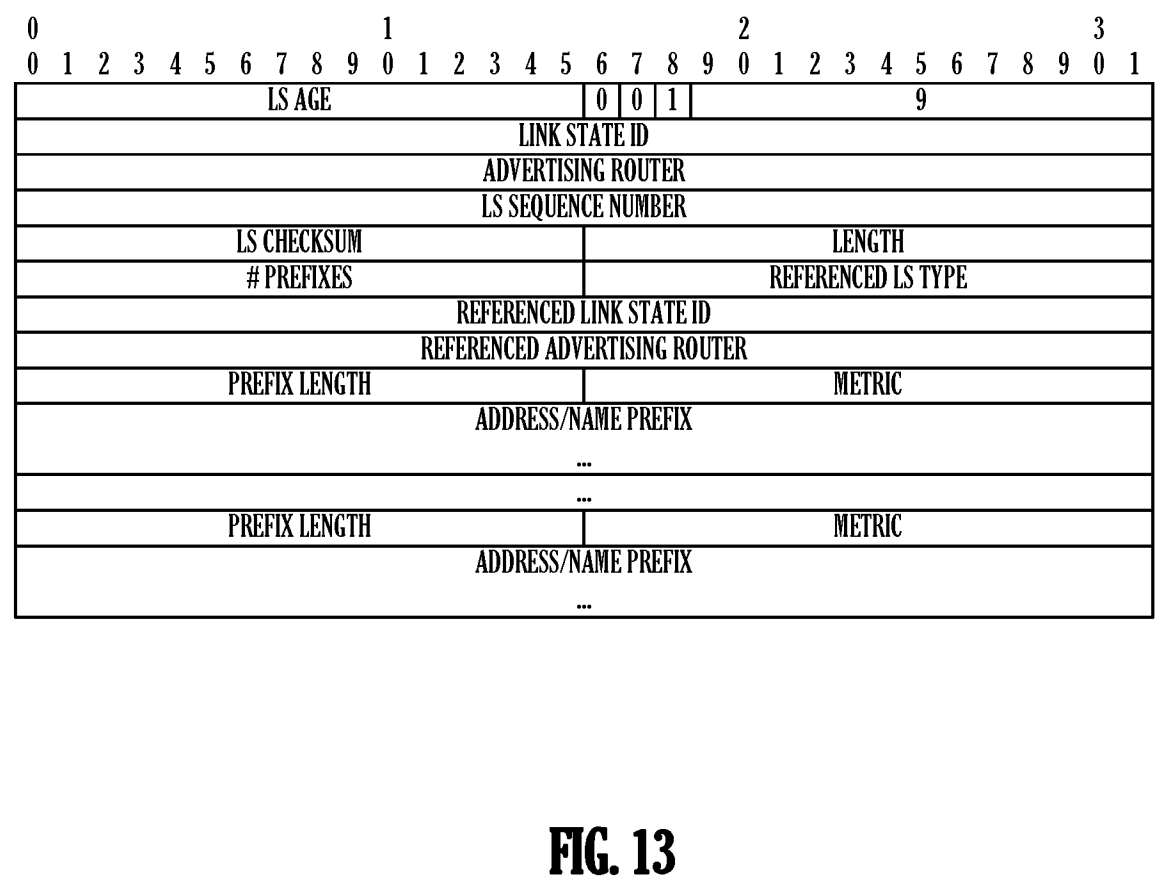

| 0 1 2 3 4 5 6 7 8 9 | 1 0 1 2 3 4 5 6 7 8 9 | 2 0 1 2 3 4 5 6 7 8 9 | 3 0 1 |
|---|---|---|---|
| LS AGE | | 0 0 1 | |
| LINK STATE ID | | | |
| ADVERTISING ROUTER | | | |
| LS SEQUENCE NUMBER | | | |
| LS CHECKSUM | | LENGTH | |
| # PREFIXES | | REFERENCED LS TYPE | |
| REFERENCED LINK STATE ID | | | |
| REFERENCED ADVERTISING ROUTER | | | |
| PREFIX LENGTH | | METRIC | |
| ADDRESS/NAME PREFIX | | | |
| ... | | | |
| ... | | | |
| PREFIX LENGTH | | METRIC | |
| ADDRESS/NAME PREFIX | | | |
| ... | | | |

1805 — RECEIVE ROUTING PACKET WITH ICN NAME AND ROUTING METRIC CORRESPONDING TO LINK

1810 — SORT ROUTING DATABASE ENTRY FOR NAME-LINK

1815 — ROUTE INTEREST PACKET BASED ON ENTRY SORT

INFORMATION CENTRIC NETWORK ROUTING

TECHNICAL FIELD

Embodiments described herein generally relate to computer networking and more specifically to Information Centric Network routing.

BACKGROUND

Information centric networking (ICN) is a transport layer or internet layer protocol that is an alternative to address based approaches, such as the Internet Protocol (IP). ICN replaces host addresses with named data (or functions in a named function networking (NFN)). ICN nodes generally include two data structures, a pending interest table (PIT) and a forwarding information base (FIB) that are used for routing.

When data is desired, a requestor releases an interest packet naming the data being sought. A receiving ICN node records the interest packet arrival along with the physical interface upon which the interest was received in a PIT entry. The ICN node uses the FIB to determine upon which physical interface to forward the interest. When a node has data that matches the name of the interest packet, such a node generally responds to the interest packet in a data packet (e.g., ICN data packet). When the data packet arrives at an interim node, that node matches the name of the data packet with a PIT entry and uses the physical interface of the PIT entry to forward the data; the PIT entry being removed once the data packet is sent.

Because only the name of the data is necessary, data may be cached throughout the network without orchestration present in host-based techniques. Thus, as a data packet traverses an interim ICN node, that node may cache the data packet to respond to future requests for the same data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates an example of a System-Intermediate System (IS-IS) packet, according to an embodiment.

FIG. 3 illustrates an example of System-Intermediate System packet ICN type-value-length (TLV) fields in an IS-IS packet, according to an embodiment.

FIG. 4 illustrates an example of TLV field structure for ICN, according to an embodiment.

FIG. 5 illustrates an example of TLV field structure for ICN, according to an embodiment.

FIG. 6 illustrates an example of TLV field structure for ICN, according to an embodiment.

FIG. 7 illustrates an example of TLV field structure for supported protocols, according to an embodiment.

FIG. 13 illustrates an example of an Intra-Area-Prefix LSA, according to an embodiment.

DETAILED DESCRIPTION

ICN content may be created in one or multiple places. Therefore, for the network to retrieve content, a route between a consumer and a producer is established. In a simple implementation, an ICN network may send interest packets through all available interfaces (e.g., faces, links, etc.)—which may be called flooding the network—until the interest packet reaches a producer and the data packets carrying the content are returned following the same path in reverse. This approach, however, generally leads to poor network performance. A routing protocol that maintains up-to-date forward routes (e.g., for interest packets) may result in better network performance.

Routing protocols generally specify how routers (or nodes that route) communicate with each other to distribute information; enabling a given router to select routes between nodes. In general, each router has a prior knowledge only of networks to which the router is directly attached. A routing protocol may share this information first among immediate neighbors, and then throughout the network. In this manner, routers accumulate aspects of the topology of the network. Often, routing protocols are resilient (e.g., dynamically adjust) to changing conditions such as disabled connections or components, and route data around obstructions. The Intermediate System routing protocol (IS-IS) and Open Shortest Path First (OSPF) are two examples of Internet Protocol (IP) routing protocols.

Some attempts to introduce routing protocols into ICNs have been made. Generally, these attempts implement ICN as a layer over IP, or other address based network, and rely on using the address of nodes to implement the routing protocol. Not only do these attempts fail to operate in native ICN environments— that is, those ICN implementations that do not have an IP layer or equivalent—such routing does not properly address the named-data based aspects that provide ICN networks an advantage over address based networks.

To address the issues noted above, described herein are modifications to the IS-IS and OSPF protocols to enable each to be used in native ICN networks. For example, with respect to IS-IS—a link layer protocol and thus network protocol-agnostic—the Type-Length-Value (TLV) format for its packets may be used for ICN name data (e.g., ICN name/prefixes) instead of Network Service Access Point (NSAP) addresses. Additionally, a multiple-source shortest path technique may be used to address the ICN possibility that content may exist in multiple locations. With respect to OSPF—one of the two most widely used routing protocols in the industry—described below are extensions to use ICN names/prefixes.

By leveraging widely used routing protocols in ICN routing, technical expertise already present in the industry may be reused in the efficient operation of ICN networks. Additional details and examples are provided below.

Figure 1:
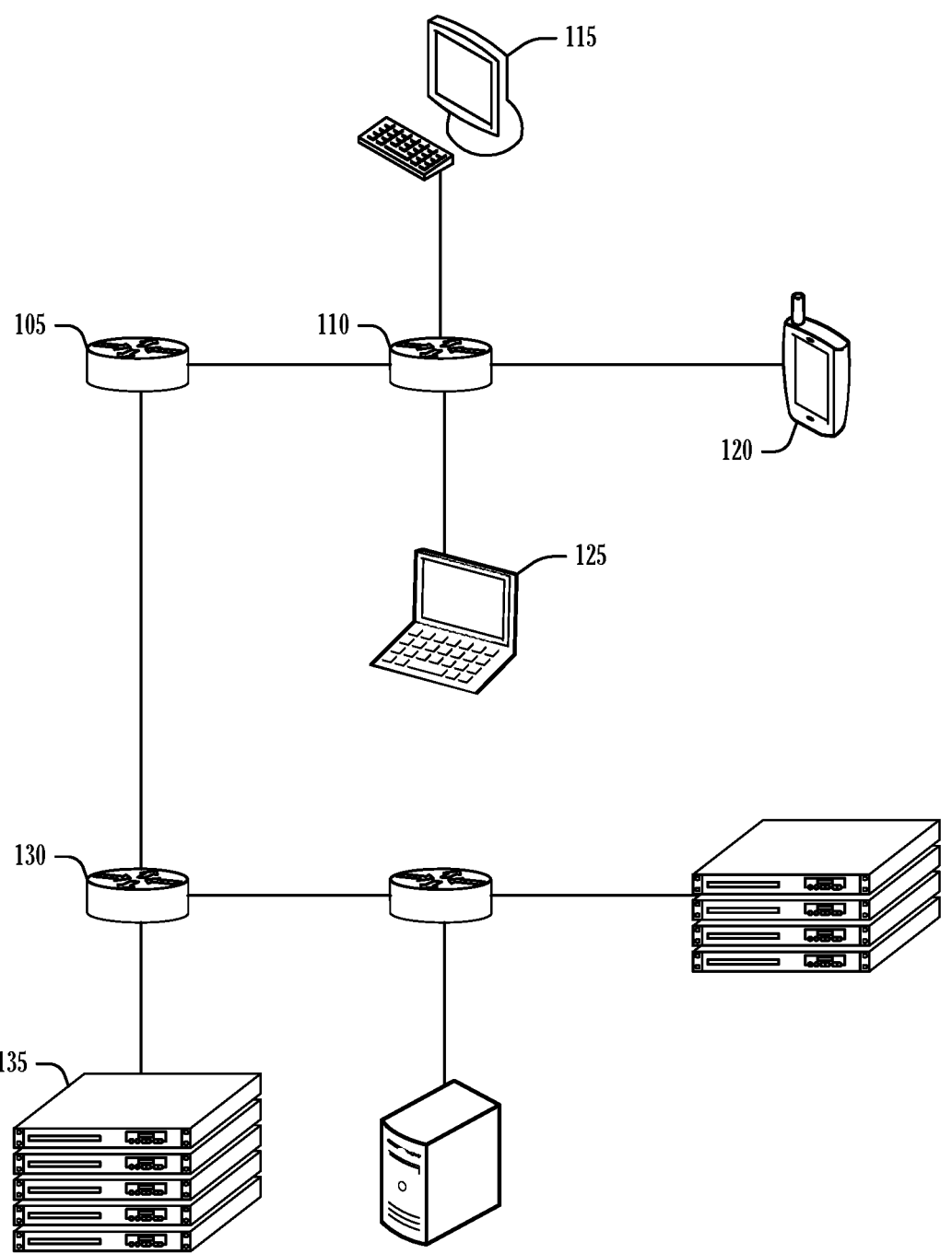
FIG. 1 is a block diagram of an example of an environment including a system for ICN routing, according to an embodiment.

FIG. 1 is a block diagram of an example of an environment including a system for ICN routing, according to an embodiment. As illustrated, a first level router 110 is directly connected to three consumer devices—such as a laptop 125, a workstation 115, and a mobile phone 120—as well as to a second level router 105. The second level router 105 is connected to another second level router 130. The second level router 130 is directly connected to several other devices, including a sever 135. In general, a distinction may be made between the first level router 110 and the second level router 105, in which the first level router 110 is an intra-area router that receives information only about directly connected devices. Such a router may only maintain data structures—such as a link-state database—for the area. In contrast, the second level router is a backbone router that manages both intra-area as well as inter-area routes, such as between the server 135 and the mobile phone 120.

For simplicity, the following routing elements are described as operating from the second level router 105, however, any of the illustrated routers may operate in the same manner given a context as that described below. The router 105 includes computer hardware, such as a memory including instructions and processing circuitry that, when in operation of the router 105, is configured by the instructions to implement ICN routing. Although a distinction is made in the illustrated devices of FIG. 1, any ICN node that forwards an interest packet or a data packet may be considered an ICN router, while every ICN router is an ICN node.

The processing circuitry is configured to receive a routing packet is received. The routing packet includes an ICN name and a routing metric. In this manner the ICN routing packet differs from addressed-based routing protocols that route between nodes based on the address of the node as opposed to the content of data. Thus, as used herein, the routing is based on selecting outbound interfaces based on metrics (e.g., hop count, latency, etc.) corresponding to names of data rather than a particular node address.

In an example, the routing packet is a link layer packet corresponding to a link of the ICN node. Here, a link is a direct connection without an intervening device. Accordingly, the connection between the first level router 110 and the laptop 125 is a link. In an example, the routing packet conforms to an IS-IS packet. In an example, the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP. The discussion below with respect to FIGS. 2-7 go into some greater details about these packet types and their use in routing.

In an example, the contents of a System Identification field of the IS-IS packet are a unique node identifier (ID) of a node that produced the IS-IS packet. Here, the unique node ID is used for disambiguation. In addressed-based networks, the address is used. However, as ICN does not have node-addresses, an alternative value is used. It does not matter what this value is, merely that the value is unique among nodes. In an example, the unique node identifier is six octets. In an example, the unique node identifier is randomly generated. In an example, the unique node identifier is an extended unique identifier from a network interface of the node that produced the IS-IS packet. Accordingly, a media-access-control (MAC) address of a network card may be used as the unique ID.

In an example, the unique node identifier is generated via a common algorithm from input parameters present on the node that created (e.g., produced) the IS-IS packet. In an example, the algorithm is a hash. In an example, the input parameters include a serial number, a manufacturer identification, a stored secret, or a media access control (MAC) address. In these examples, a hash may enable a specific length unique ID while avoiding collisions between generated addresses. Accordingly, several pieces of data that uniquely identify a given node may be hashed into a more compact (e.g., fewer bits) representation that is unlikely to be the same as applying the hash to other node's data.

In an example, the name and the routing metric are encoded in type-length-value (TLV) fields in the IS-IS packet. In an example, the TLV fields are arranged in multiple levels. In an example, an outer level TLV field indicates that a contained value includes individual ICN names and an inner level TLV field includes the metric for the ICN name. FIG. 4 and FIG. 5 respectively illustrate an example of single and multi-level TLV fields.

In an example, the routing metric is one of a set of routing metrics. In an example, the set of routing metrics include a default metric. In an example, the set of routing metrics include a delay metric. In an example, the set of routing metrics include an expense metric. In an example, the set of routing metrics include an error metric. In an example, these metrics conform to standard IS-IS metrics.

In an example, a link state advertisement (LSA) encodes an ICN name/prefix (name/prefix is used herein to indicate either a complete ICN name, or the first part of the ICN name called a prefix.) using a sixteen bit prefix PrefixLength field, a PrefixOptions field being absent. Because the Pre-fixOptions field was intended for address-based routing, there is no use in reserving this field for its originally intended purpose. Thus, the bits of the PrefixOption field may be used encode a more detailed ICN name. In an example, the LSA is an Inter-Area-Prefix-LSA, an AS-external-LSA, a NSSA-LSA, a Link-LSA, or an Intra-Area-Prefix LSA.

In an example, the routing packet is Open Shortest Path First (OSPF) packet. In an example, a name structure for the ICN name is encoded in a name structure field of the OSPF packet. This example permits greater flexibility to encode ICN names—which are general unrestricted in length and hierarchical in nature—into OSPF fields originally defined for addresses. In an example, the OSPF packet is a HELLO packet. In an example, the OSPF packet is a database description packet. In an example, the OSPF packet is a link-state request packet. In an example, the OSPF packet is a link state update packet. In an example, the OSPF packet is a link state acknowledgement packet. The discussion below with respect to FIGS. 8-17 provide additional details about these packets.

In an example, the OSPF packet uses an instance identification (ID) of 128 to indicate a base ICN name/prefix address family (AF). In an example, the OSPF packet uses an instance identification (ID) in the range of 129-159 to indicate ICN name/prefix address families (AFs) dependent upon local policy.

The processing circuitry is configured to sort an entry for the link-and-name into a local routing data store based on the routing metric. In an example, the local routing data store is a forwarding information base (FIB). In these examples, when a new interest packet is received, the name specified in the interest packet is used to search the FIB. There may be multiple outbound interfaces at which the content may be received. However, a subset (e.g., one) interface is selected based on the metrics to retrieve the content. By sorting the entries corresponding to the name, the top result may then be used for the outbound interface. In an example, sorting the entry for the link-and-name into the local routing data store based on the routing metric includes calculating a Multiple-Source Shortest Path (MSSP) score for the entry from the metric and other entries corresponding to the name, wherein multiple entries have an equivalent MSSP score for the name. In this example, some duplication of interest packets is allowed to, for example, decrease the likelihood that a follow-up interest packet need be sent in case the original did not result in a data packet containing the content. In this way, the possibly distributed nature of data in an ICN network may be leveraged without flooding the network.

The processing circuitry is configured to route an interest packet for the name via the link based on the entry having a highest rank in the local routing data store. Implementing the route based on the rank of the data store entry generally ensures that the most efficient routing occurs. Some additional IS-IS and OSPF details are given below.

FIGS. 2-7 illustrate various components for an IS-IS style routing for ICN. IS-IS is a link state routing protocol that uses the Dijkstra Algorithm (shortest path first (SPF)) to compute the best path through the network. IS-IS was originally designed for Connectionless-mode Network Protocol (CLNP). IS-IS is a scalable routing protocol where a backbone is formed by a group of routers (ISs), such as the second level router 105 and the second level router 130. IS-IS packets are directly encapsulated in layer two (e.g., link layer) frames (e.g., Ethernet, Wi-Fi, etc.).

In IS-IS, there are three types of routers:
1. Level One system (L1): This is an intra-area router that only knows what its area looks like and only learns prefixes from its own area. This type of router creates a level-1 link-state database and SPF tree for the area;
2. Level Two system (L2): This is a backbone router that knows all intra-area and inter-area routes. This type of routers creates a level-2 link-state database and SPF tree for the backbone; and
3. Level One-Two system (L1-L2): This is a router that performs both roles (L1 and L2). It creates two databases (level-1 link-state and level-2 link-state databases) and two SPF trees, one for each database.

Load splitting is enabled by identifying a set of equal cost paths. Accordingly, a router that computes SPF may return a set of paths to a destination. In an example, the set may include a single path of minimum metric sum (e.g., minimum cost path), a set of paths of equal minimum metric sum (e.g., equal minimum cost paths), or a set of paths which will get a packet data unit (PDU) closer to its destination than the local system (e.g., downstream paths).

There are three categories of packets in IS-IS:
1. IS-IS Hello protocol data units (IIHs): These packets establish and maintain adjacencies between IS-IS neighbors;

2. Link State PDUs (LSPs): These packets are responsible to distribute routing information between IS-IS nodes; and
3. Sequence Number PDUs (SNPs): These packets control the distribution of LSPs. SNPs provide mechanism to synchronize LSDBs between routers in the same area.

FIG. 2 illustrates an example of a System-Intermediate System (IS-IS) packet, according to an embodiment. In general, the IS-IS packets, including the LSPs, have fixed header size and use TLV encoding for the contents. The generic packet format and the common fields shared by all IS-IS packets (i.e., Hello, link state and sequence number packets) is shown in FIG. 2. The Intra-domain Routing Protocol Discriminator is the network layer identifier assigned to IS-IS. Its value is 131. Length Indicator is the size of the packet header fields in octets. Version/Protocol ID Extension has a value of 1. ID Length indicates length of the source ID field. Version has a value of 1. Reserved (R) are unused bits (set to 0 s). Maximum Area Addresses indicates the maximum number of addresses per area with values between 1 and 254 for actual number (a value of 0 implies a maximum of three addresses per area).

Each category has various types of packets. The following table lists all packet types, and corresponding PDU type number, in IS-IS:

| Category | Packet Type | PDU Type |
|---|---|---|
| HELLO | LAN Level-1 HELLO | 15 |
| | LAN Level-2 HELLO | 16 |
| | Point-to-point HELLO | 17 |
| LSP | Level-1 LSP | 18 |
| | Level-2 LSP | 20 |
| SNP | Level-1 Complete SNP | 24 |
| | Level-2 Complete SNP | 25 |
| | Level-1 Partial SNP | 26 |
| | Level-2 Partial SNP | 27 |

The following illustrates several features added to IS-IS to support the routing of ICN names. Several parts of the IS-IS protocol may be modified to enable IS-IS to route ICN names such as system identification (e.g., "System ID" or "ID"), LSP packets (Level-1 or Level-2), enabling multiple source routing, etc.

With respect to System Identification, the larger the name (ID) of the router, the exchange of packets between routers becomes less efficient because this information is sent in the packets. From this perspective, it is more efficient to keep the router identification as simple as possible. That is, keeping the router identification information as in IS-IS, where the system ID (router identification) is sent in a variable length field (1-8 octets). If "ID Length" field value is zero (0), then the length if "ID" field is 6 octets. Since IS-IS was originally designed for Open System Interconnect (OSI) networks, it used to use the MAC address of one of the router interfaces as its system ID. When IS-IS was adapted to route IP packets, the address of a node (prepending hex 02 00) is used as its system ID.

In general, the system ID has to be unique. One option to guarantee unique identification for each node is using a 48-bit extended unique identifier (EUI-48) from one of the router's interfaces. Thus, "ID Length" value is set to zero in this example. That is, only 6 octets are used to uniquely identify each router and there is no need use 36 octets to name/identify a router. Another option to achieve unique IDs includes generating the system IDs (numbers, strings, etc.) through an algorithm (e.g., a hash) and later configuring the system ID in each router.

FIGS. 3-5 illustrate examples of Level 1 LSP packets. IS-IS was originally designed for routing the Connectionless Network Service (CLNS) protocol. Later extensions were added to also route IPv4 or IPv6 addresses and multi-protocol label switching (MPLS) Traffic Engineering. As per the Internet Assigned Number Authority (IANA) type assignment in IS-IS, types 67 through 127, and 252 through 65535 are unassigned (among other ranges) and may be for the ICN information. For example, as illustrated in FIG. 3, Type numbers starting at 70 are used. Thus, ICN prefixes/names that are reachable inside the routing domain may be assigned type 70. Although any unassigned type may be used for ICN prefixes, in general, type number should be standardized.

In general, each ICN prefix/name is expressed as a TLV field that follows the same format (Type, value, length) as how the names are encoded in the ICN Interest and Data packets. There might be at least two ways to encode the ICN names into this field, which may be called the ICN Internal reachability information. In a first way, a 2-level nested TLV, as illustrated in FIGS. 3 and 4, may be used. Here, the outer TLV indicates that the value carries individual ICN prefixes/names and the inner TLVs provide the specific information for an ICN name/prefix, including metrics. Thus, the inner TLV includes multiple fields for an ICN Name/Prefix and its metrics. The format for the octets of the metrics may follow the same principle as in the original IS-IS. For example:

Default metric is the value of the default metric for the path to the listed ICN prefix/name. Bit 8 of this field is reserved and set to zero (0) and bit 7 of this field indicates the metric type (internal or external).

Delay metric is the value of the delay metric for the path to the listed ICN prefix/name. If the router does not support this metric, it has to set bit "S" to 1 (unsupported). Bit 7 (marked I/E) indicates the metric type and it is set to zero (0) indicating internal metric.

Expense metric is the value of the expense metric for the path to the listed ICN prefix/name. If the router does not support this metric, it has to set bit "S" to 1 (unsupported). Bit 7 (marked I/E) indicates the metric type and it is set to zero (0) indicating internal metric.

Error metric is the value of the delay metric for the path to the listed ICN prefix/name. If the router does not support this metric, it has to set bit "S" to 1 (unsupported). Bit 7 (marked I/E) indicates the metric type and it is set to zero (0) indicating internal metric.

FIG. 5 illustrates an example of TLV field structure for ICN, according to an embodiment. Here, a single-level TLV is used where the outer TLV indicates that the value carries individual ICN prefixes/names and inner TLV provides the specific information for ICN name/prefix, including its metrics.

Figure 6:
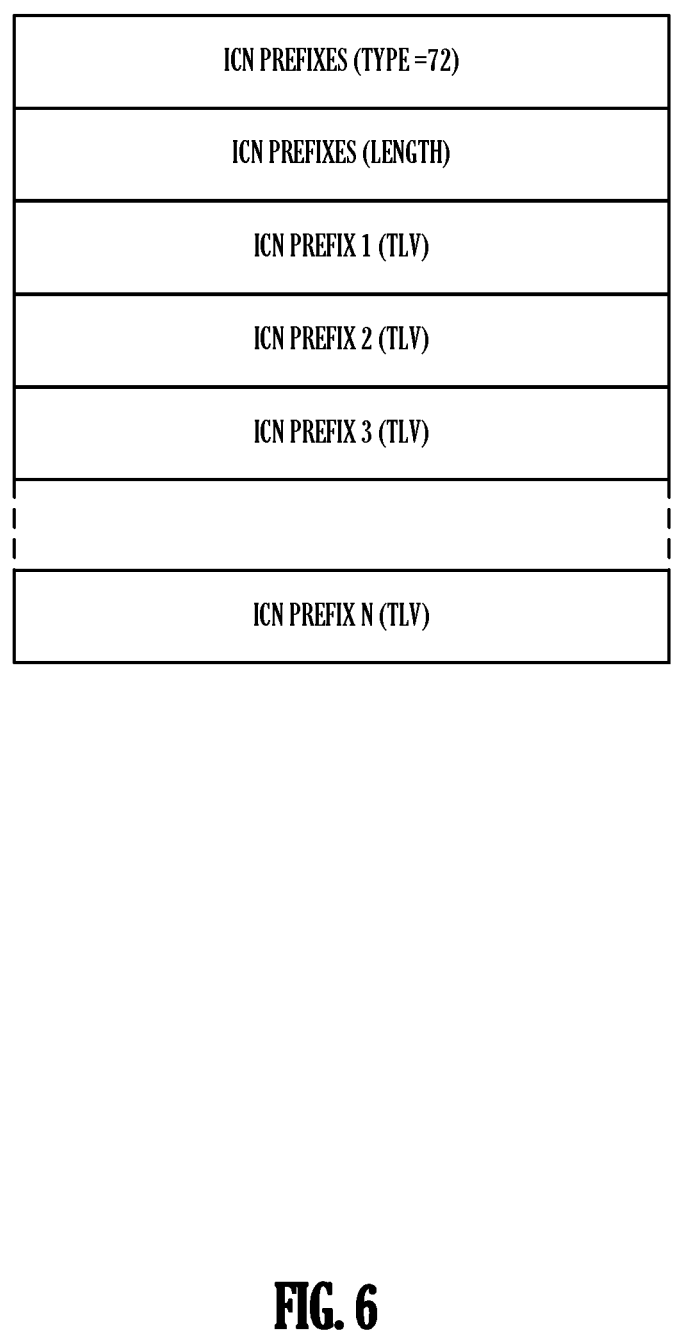
Figure 8:
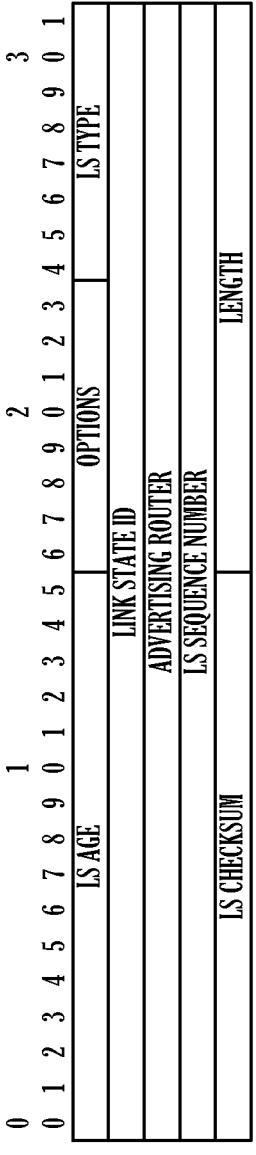
FIG. 8 illustrates an example of an Opaque Link State Advertisement (LSA) (OLSA) message format, according to an embodiment.

FIG. 6 illustrates an example of TLV field structure for ICN, according to an embodiment. FIGS. 6-8 address Level-2 LSP packets. The level-2 LSP packets include at least two additional fields for ICN names/prefixes routing. For example, a field to carry the list of ICN prefixes/names that are reachable inside the router's area is added to standard IS-IS level-2 LSP packets. The structure of this modification is the same described above with to the Level-1 LSP packets (ICN prefixes/names that are reachable inside the routing domain).

A second field that is added includes the list of ICN prefixes/names that are reachable outside the routing domain (e.g., ICN external reachability information). This field may be assigned type 72. As with the ICN internal reachability information, there may be at least two ways to encode the ICN names that are outside the routing domain into this field (ICN External reachability information). Again, a 2-level nested TLV, as illustrated in FIG. 4, may be used. In this example, the outer TLV (e.g., FIG. 6) indicates that the value carries individual ICN prefixes/names and inner TLV (FIG. 4) provides the specific information for ICN name/prefix, including its metrics. The inner TLV has multiple fields that include an ICN Name/Prefix and its metrics. The format for the octets of the metrics follows the same principle as in the original IS-IS, which was explained above.

In an example, a single-level TLV, as illustrated in FIG. 5, may be used. Here, the outer TLV indicates that the value carries individual ICN prefixes/names and inner TLV provides the specific information for ICN name/prefix, including its metrics.

FIG. 7 illustrates an example of TLV field structure for supported protocols, according to an embodiment. CLNS, Network Layer Protocol Identifier (NLPID) currently only has reserved Initial Protocol Identifier (IPI) and Subsequent Protocol Identifier (SPI) for the following protocols: IPv4, IPv6 and Point-to-Point Protocol (PPP). Therefore, a new NLPID is used for ICN/NDN protocol. This information will be carried in the Protocols Supported TLV field (Type=129), as illustrated, for IS-IS to indicate what network protocols it supports. One octet NLPID is used per each supported network protocol. This modification affects the LAN Level-1 Hello, LAN Level-2 Hello and Level-2 LSP packets.

Because ICN generally causes multiple sources to have requested named-data, multiple routes may be useful. In general, IS-IS supports minimum cost path, equal minimum cost paths, and downstream paths. These metrics were developed for address-based networks where the objective is to find a single route between a source and a destination. However, in ICN, the content may be in several locations, such as at a producer and in a router cache. To address this issue, a Multiple-source Shortest Path (MSSP) technique may be employed. MSSP may be expressed follows: Given a graph $G=(V,E)$ and a source set $S \subseteq V$, compute shortest-path distance $d_G(s,v)$ for some $(s,v) \in S \times V$ and encode shortest-path trees rooted at each $s \in S$.

In an example, transient caching at ICN nodes is ignored for MSSP. Consider, there may be at least two reasons why the content is in more than one location. First, a replica of the content may be located in multiple places (as it currently happens with content data networks (CDNs)). Second, the content was already requested a copy of the content is temporarily cached in intermediary nodes. More dynamic case, like the second, may result in inefficient network overhead as every node may have different caching policies (e.g., Least Recently Used (LRU), First In First Out (FIFO), Least Frequently Used (LFU), Random, etc.) and may dynamically remove packets in different manners. For IS-IS routing to keep up, whenever content is added or removed from a cache, Level-1 LSP or Level-2 packets may be generated to update other routers of the change. Accordingly, a lot of overhead may be produced to little practical benefit.

FIGS. 8-17 illustrate various components for an OSPF style routing for ICN. OSPF was originally created as an intra-domain routing protocol for IP-based networks. OSPFv2 and OSPFv3 were respectively designed for IPv4 and IPv6 networks. Implementations of OSPF have used Opaque Link State Advertisements (LSA). Opaque LSAs are used herein to extend the capabilities of OSPFv2 and to enable transmission of arbitrary data that is not necessarily relevant for OSPF.

FIG. 8 illustrates an example of an Opaque Link State Advertisement (LSA) (OLSA) message format, according to an embodiment. The following table explains the illustrated data fields:

| LS Age | The age of the LSA in seconds |
|---|---|
| Options | Optional capabilities associated with the LSA |
| LS Type | 10—area-local scope; Opaque LSAs are not flooded beyond the local area. |
| Opaque Type | Specifies the application specific type of the Opaque LSA e.g., encoded in the illustrated LINK STATE ID (see FIG. 17) |
| Opaque ID | Type—specific ID e.g., encoded in the illustrated LINK STATE ID (see FIG. 17) |
| Advertising Router | Router ID of the LSAs originator |
| LS Sequence Number | Used to detect old and duplicate LSAs |
| LS Checksum | Checksum of the complete header except the LS Age field |
| Length | Total header length |
| Opaque Information | Application-specific data (ICN/NDN Names/prefix): Size in Bytes of Name Prefix (32 bits) Name Type (8 bits) Name Prefix (variable size) |

Figure 9:
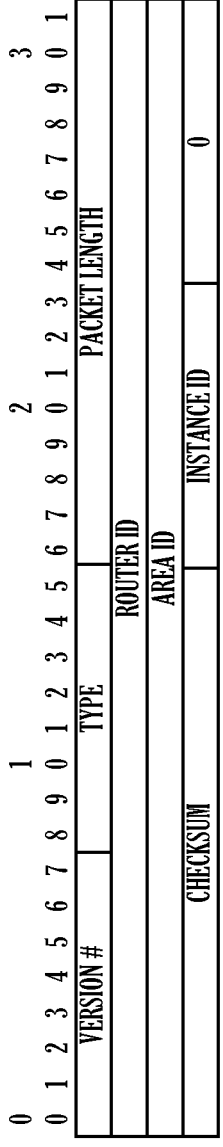
FIG. 9 illustrates an example of an Open Shortest Path First (OSPF) packet header, according to an embodiment.
Figure 10:
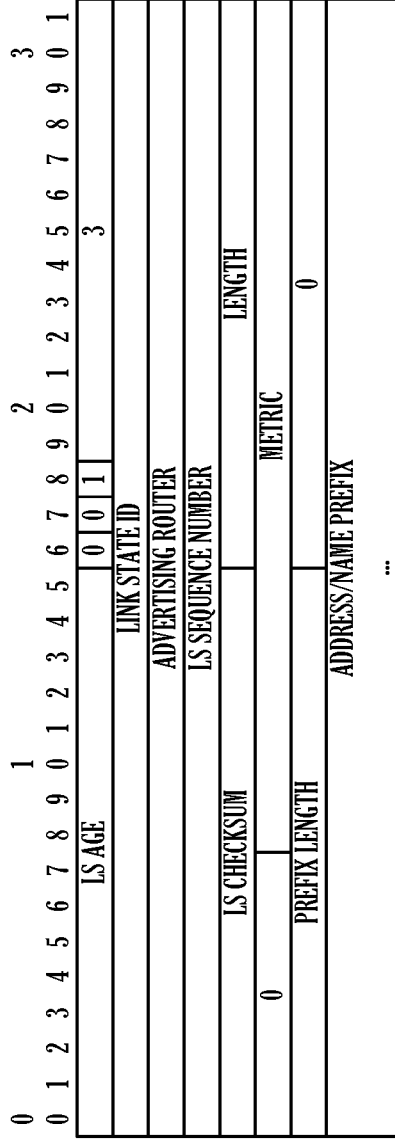
FIG. 10 illustrates an example of an Inter-Area-Prefix LSA, according to an embodiment.
Figure 11:
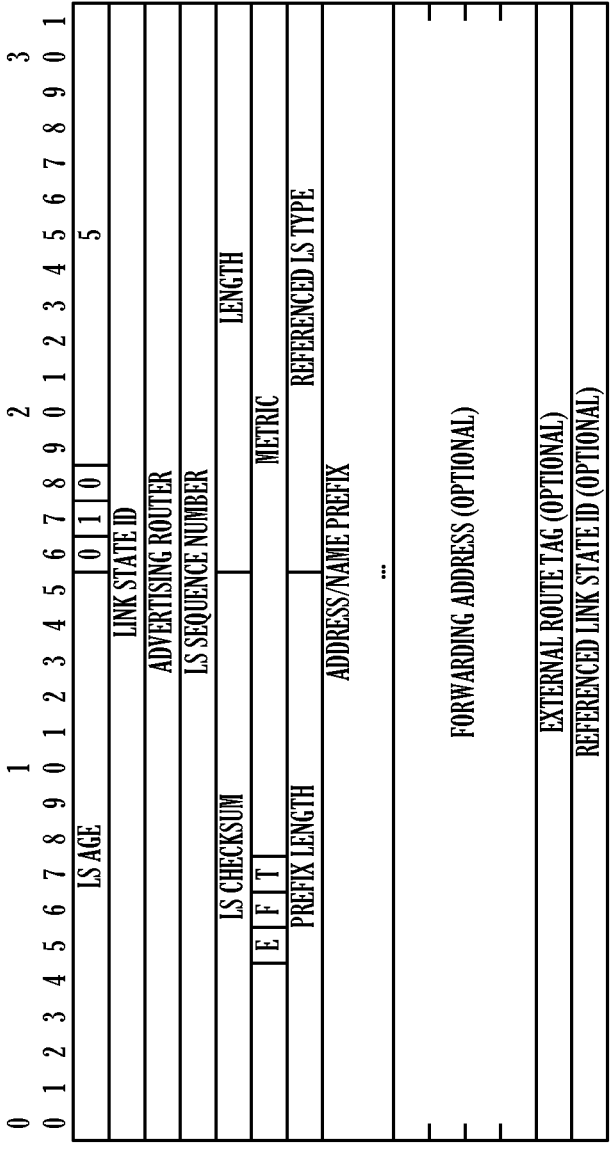
FIG. 11 illustrates an example of an AS-external LSA, according to an embodiment.
Figure 12:
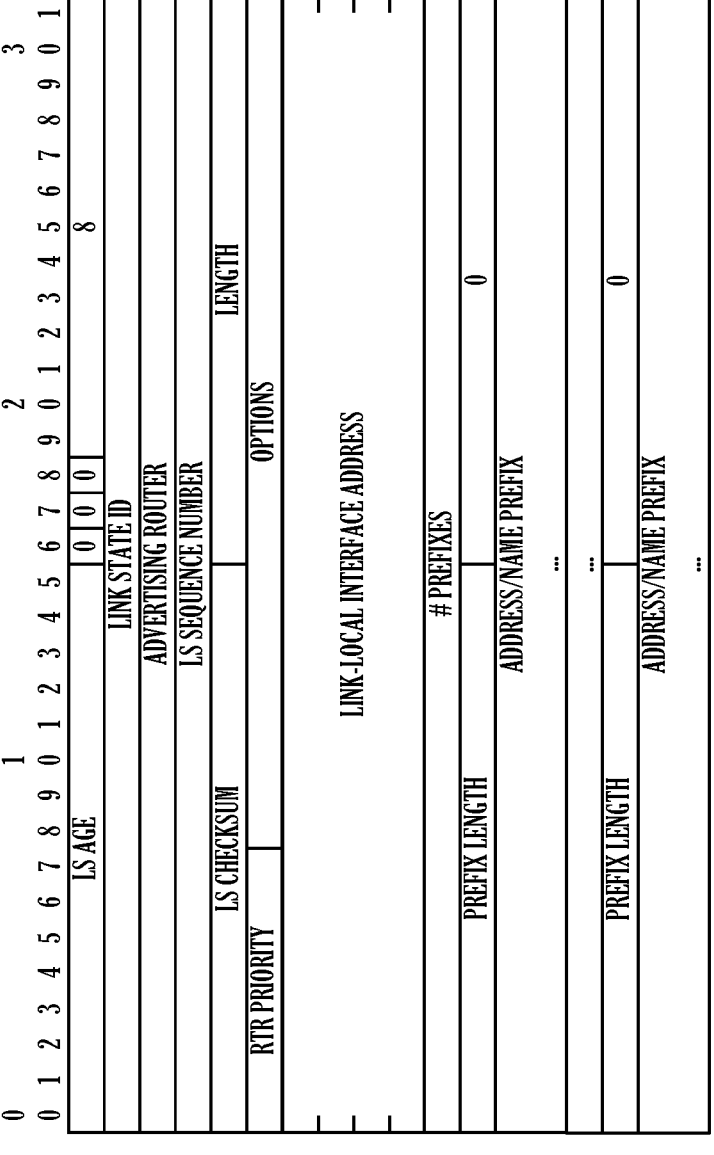
FIG. 12 illustrates an example of a Link LSA, according to an embodiment.

FIG. 9 illustrates an example of an Open Shortest Path First (OSPF) packet header, according to an embodiment. The following table explains the illustrated data fields:

| Version # | The OSPF version number. In this case 3 |
|---|---|
| Type | The OSPF packet types: |

| | Type | Description |
|---|---|---|
| | 1 | Hello |
| | 2 | Database Description |
| | 3 | Link State Request |
| | 4 | Link State Update |
| | 5 | Link State Acknowledgment |

| Packet Length | The length of the OSPF protocol packet in bytes |
|---|---|
| Router ID | The Router ID of the packet's source |
| Area ID | A 32-bit number identifying the area to which this packet belongs |
| Checksum | OSPF uses the standard checksum calculation for IPv6 applications |
| Instance ID | Enables multiple instances of OSPF to be run over a single link |
| 0 | These fields are reserved |

The following table illustrates Instance ID address family (AF) values in current OSPF implementations:

| Instance ID | Description |
|---|---|
| 0 | Base IPv6 Unicast AF |
| 1-31 | Base IPv6 Unicast AF dependent on local policy |
| 32 | Base IPv6 Multicast |
| 33-63 | IPv6 Multicast AFs dependent on local policy |
| 64 | Base IPv4 Unicast AF |
| 65-95 | IPv4 Unicast AFs dependent on local policy |
| 96 | Base IPv4 Multicast |
| 97-127 | IPv4 Multicast AFs dependent on local policy |

-continued

| Instance ID | Description |
|---|---|
| 128-191 | Unassigned |
| 192-255 | Reserved for Private Use |

The following modifications to OSPF enable ICN-specific information advertisement to support routing of ICN names in multi-stack networks. For example, new Instance ID(s) to identify the OSPF packets for ICN are added. For this purpose, and following the RFC5838, the following table illustrated assigned Instance IDs for ICN names:

| Instance ID | Description |
|---|---|
| 0 | Base IPv6 Unicast AF |
| 1-31 | IPv6 Unicast AF dependent on local policy |
| 32 | Base IPv6 Multicast |
| 33-63 | IPv6 Multicast AFs dependent on local policy |
| 64 | Base IPv4 Unicast AF |
| 65-95 | IPv4 Unicast AFs dependent on local policy |
| 96 | Base IPv4 Multicast |
| 97-127 | IPv4 Multicast AFs dependent on local policy |
| 128 | Base ICN name/prefix AF |
| 129-159 | ICN name/prefix AFs dependent on local policy |
| 160-191 | Unassigned |
| 192-255 | Reserved for Private Use |

In an example, ICN names/prefixes are advertised. Given that OSPFv2 was originally designed to route only IPv6 addresses (128 bits), the PrefixLength (an 8-bit field) represents the length of the IPv6 address prefix in bits. As per the NDN Packet Format Specification, there is no limit in size of the ICN names/prefixes and their size is not fixed. Accordingly, the PrefixLength field is changed—with a minimum impact to the current LSA format—by being expanded a 16-bit field and the PrefixOptions field is removed because the four bits used in the PrefixOptions field are not applicable to ICN networks. In an example, for ICN names/prefixes (Instance IDs between 128 and 159), the PrefixLength field holds the value of the Address Prefix in bytes. This change may be applied to any one or more of an Inter-Area-Prefix-LSA (illustrated in FIG. 10), AS-external-LSA (illustrated in FIG. 11), an NSSA-LSA (similar format as AS-external-LSA illustrated in FIG. 11 but LS Type is 7 instead of 5), Link-LSA (illustrated in FIG. 12), and Intra-Area-Prefix LSA (illustrated in FIG. 13).

Figure 14:
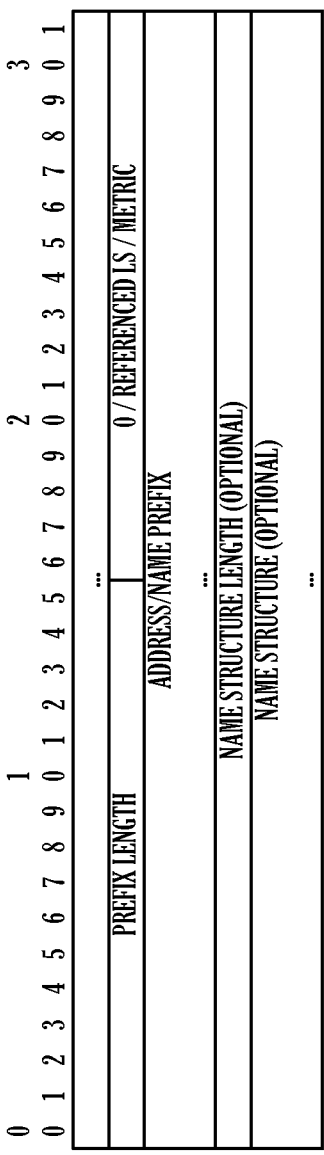
FIG. 14 illustrates an example of a name structure field added after an ICN name prefix, according to an embodiment.

FIG. 14 illustrates an example of a name structure field added after an ICN name prefix, according to an embodiment. In addition to sending the ICN names/prefixes in the above LSAs (FIGS. 10-13), a name structure field may be added to every ICN Name prefix. The "name structure" provides context of the ICN names (an ICN name is structured data interpreted as unstructured) to the intermediary nodes. For example, the structure description (e.g., name structure field value) may be "country/state/city/company/department/sub-department" to enable parsing of the ICN name and extraction of specific sub-name elements for different route handling. The name structure may be used for various purposes, including route selection (e.g., never send U.S. originated traffic via China as transient point), cache selection (e.g., to be in a particular geographical entity such as Ghana or within the enterprise premises), Quality-of-Service enforcement, access control (e.g., only marketing department), etc. As illustrated, the name structure may have two fields. A first field for the length (e.g., given in bytes) and a second field for the name structure information itself. This field can be optional or mandatory.

Figure 15:
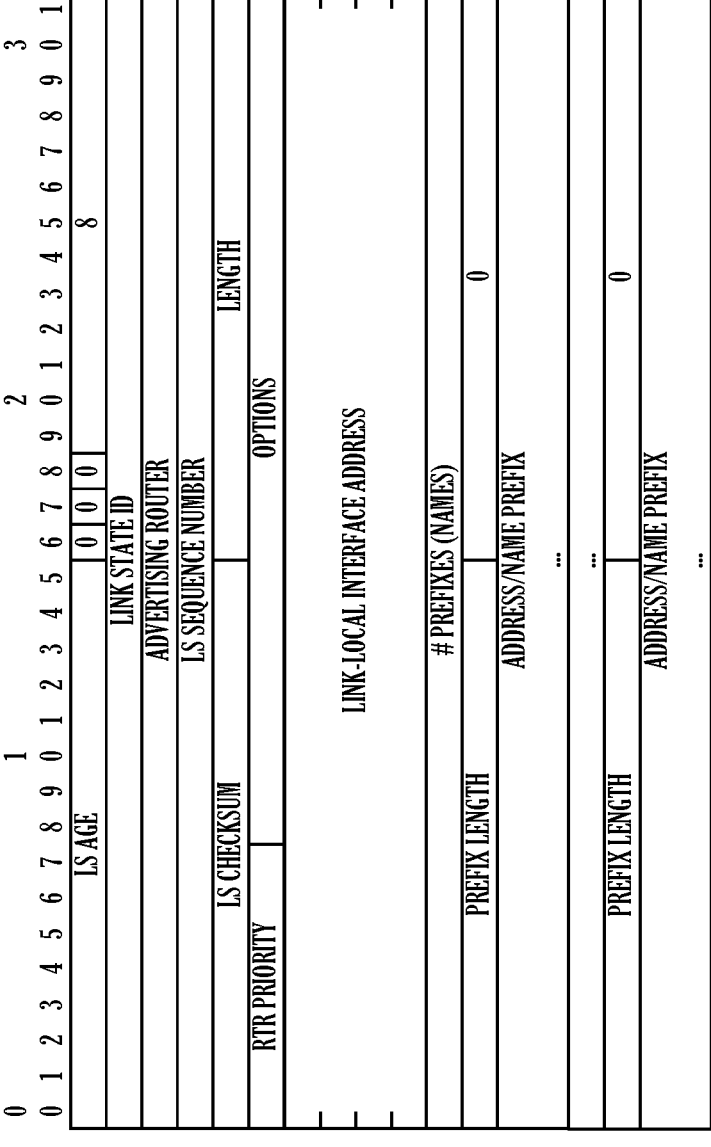
FIG. 15 illustrates an example of a Link-Local address, according to an embodiment.

FIG. 15 illustrates an example of a Link-Local address, according to an embodiment. Consider the Next-Hop calculation of OSPF. Generally, OSPF implementations on top of IP, using an UP link local address for control packets and next-hop calculations. The link local address field is constrained to 128 bits. For the case of ICN, a unique names/prefixes or identification of up to 128 bits may be used without modifying the size of this field as illustrated.

Figure 16:
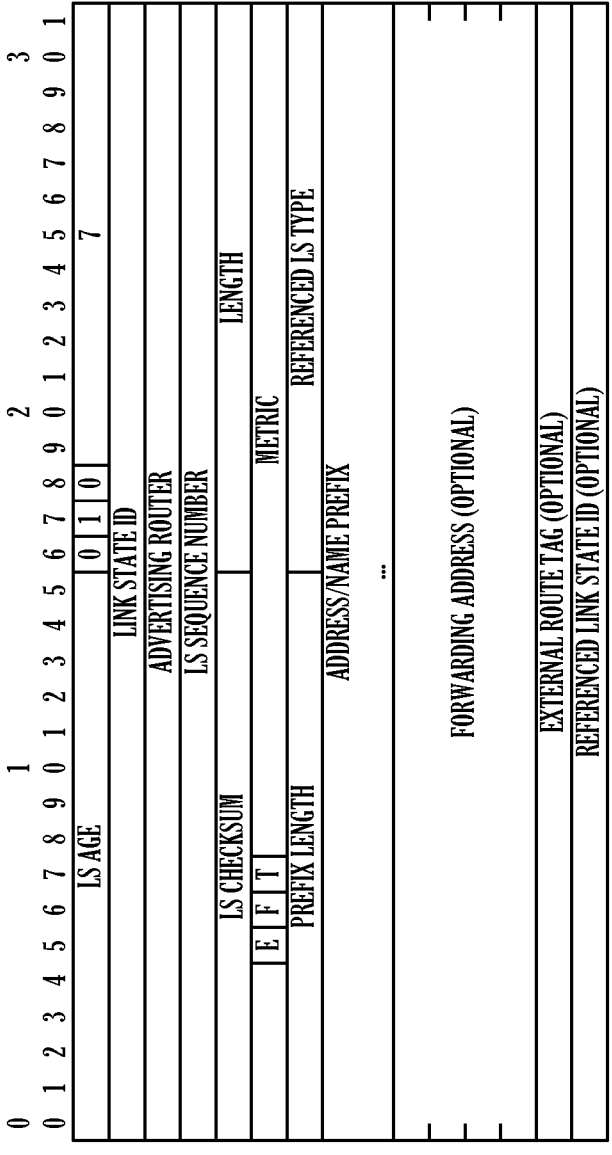
FIG. 16 illustrates an example of a forwarding address, according to an embodiment.

FIG. 16 illustrates an example of a forwarding address, according to an embodiment. The illustrated LSA is an AS-External-LSAs, but the same applies to NSSA-LSAs. The forwarding address for ICN is still constrained to 128 bits and it may be the next-hop gateway for an external prefix or may be set through manual configuration.

Figure 17:
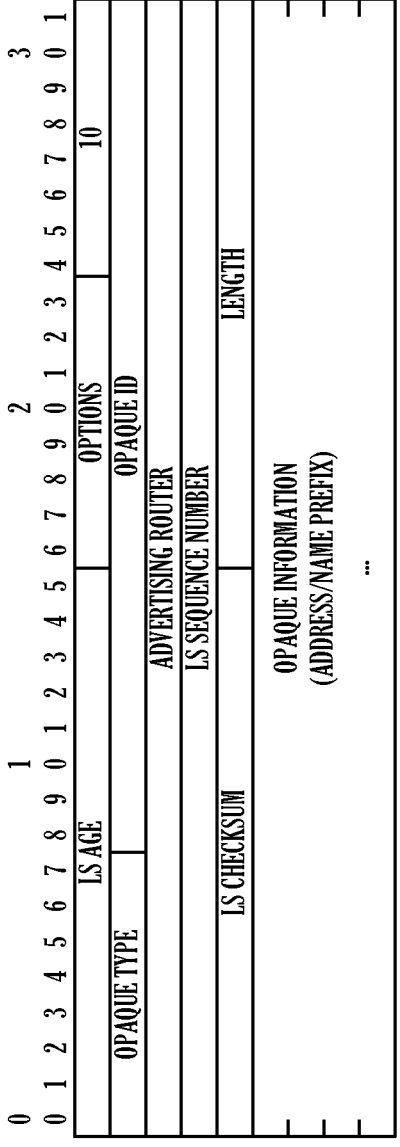
FIG. 17 illustrates an example of an Opaque LSA for ICN as an overlay, according to an embodiment.

FIG. 17 illustrates an example of an Opaque LSA for ICN as an overlay, according to an embodiment. If ICN is deployed as an overlay network (e.g., on top of IPv4 or IPv6), ICN names/prefixes may be sent using Opaque LSAs (LS type=10) as illustrated. Here, the information inside the "Opaque Information" field carries the ICN names/prefixes and delivers it to the overlay network (e.g., ICN). In an example, the ICN names may be sent in without modification or may be sent in a compressed form, as a hash-like form or any other representation.

Figure 18:
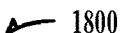
FIG. 18 illustrates a flow diagram of an example of a method for ICN routing, according to an embodiment.
Figure 18:
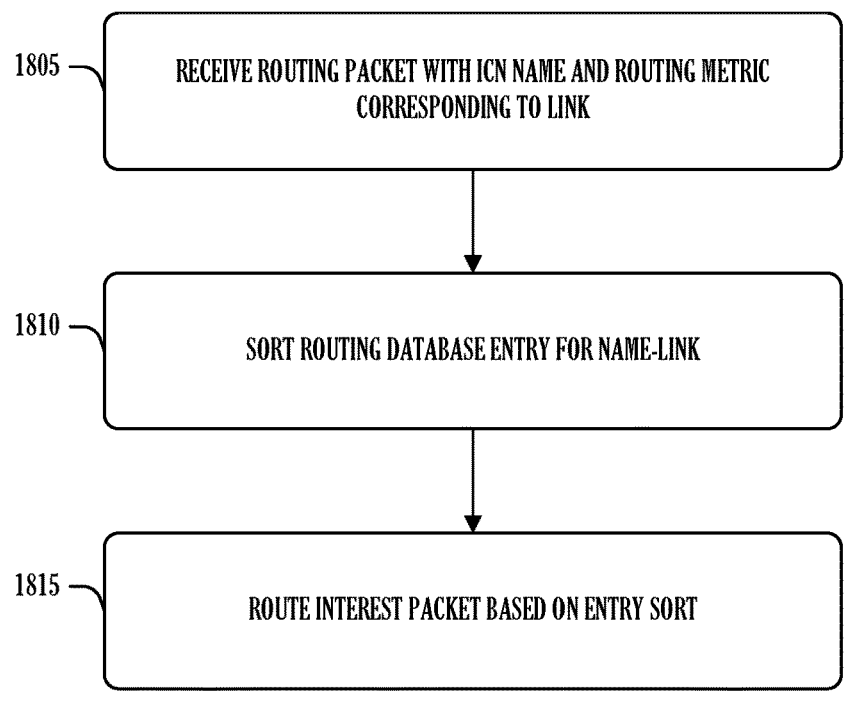

FIG. 18 illustrates a flow diagram of an example of a method 1800 for ICN routing, according to an embodiment. The operations of the method 1800 are performed by computational hardware, such as that described above or below (e.g., processing circuitry).

At operation 1805, a routing packet is received at an ICN node. The routing packet includes an ICN name and a routing metric. In an example, the routing packet is a link layer packet corresponding to a link of the ICN node. In an example, the routing packet conforms to an Intermediate System-Intermediate System (IS-IS) packet. In an example, the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

In an example, the contents of a System Identification field of the IS-IS packet are a unique node identifier of a node that produced the IS-IS packet. In an example, the unique node identifier is six octets. In an example, the unique node identifier is randomly generated. In an example, the unique node identifier is an extended unique identifier from a network interface of the node that produced the IS-IS packet.

In an example, the unique node identifier is generated via a common algorithm from input parameters present on the node that produced the IS-IS packet. In an example, the algorithm is a hash. In an example, the input parameters include a serial number, a manufacturer identification, a stored secret, or a media access control (MAC) address.

In an example, the name and the routing metric are encoded in type-length-value (TLV) fields in the IS-IS packet. In an example, the TLV fields are arranged in multiple levels. In an example, an outer level TLV field indicates that a contained value includes individual ICN names and an inner level TLV field includes the metric for the ICN name.

In an example, the routing metric is one of a set of routing metrics. In an example, the set of routing metrics include a default metric. In an example, the set of routing metrics include a delay metric. In an example, the set of routing metrics include an expense metric. In an example, the set of routing metrics include an error metric.

In an example, the routing packet is Open Shortest Path First (OSPF) packet. In an example, a name structure for the ICN name is encoded in a name structure field of the OSPF packet. In an example, the OSPF packet is a HELLO packet. In an example, the OSPF packet is a database description packet. In an example, the OSPF packet is a link-state request packet. In an example, the OSPF packet is a link state update packet. In an example, the OSPF packet is a link state acknowledgement packet.

In an example, the OSPF packet uses an instance identification (ID) of 128 to indicate a base ICN name/prefix address family (AF). In an example, the OSPF packet uses an instance identification (ID) in the range of 129-159 to indicate ICN name/prefix address families (AFs) dependent upon local policy.

In an example, a link state advertisement (LSA) encodes an ICN name/prefix using a sixteen bit prefix PrefixLength field, a PrefixOptions field being absent. In an example, the LSA is an Inter-Area-Prefix-LSA, an AS-external-LSA, a NSSA-LSA, a Link-LSA, or an Intra-Area-Prefix LSA.

At operation 1810, an entry for the link-and-name is sorted into a local routing data store based on the routing metric. In an example, the local routing data store is a forwarding information base (FIB). In an example, sorting the entry for the link-and-name into the local routing data store based on the routing metric includes calculating a Multiple-Source Shortest Path (MSSP) score for the entry from the metric and other entries corresponding to the name, wherein multiple entries have an equivalent MSSP score for the name.

At operation 1815, an interest packet for the name is routed via the link based on the entry having the highest rank in the local routing data store.

Figure 19:
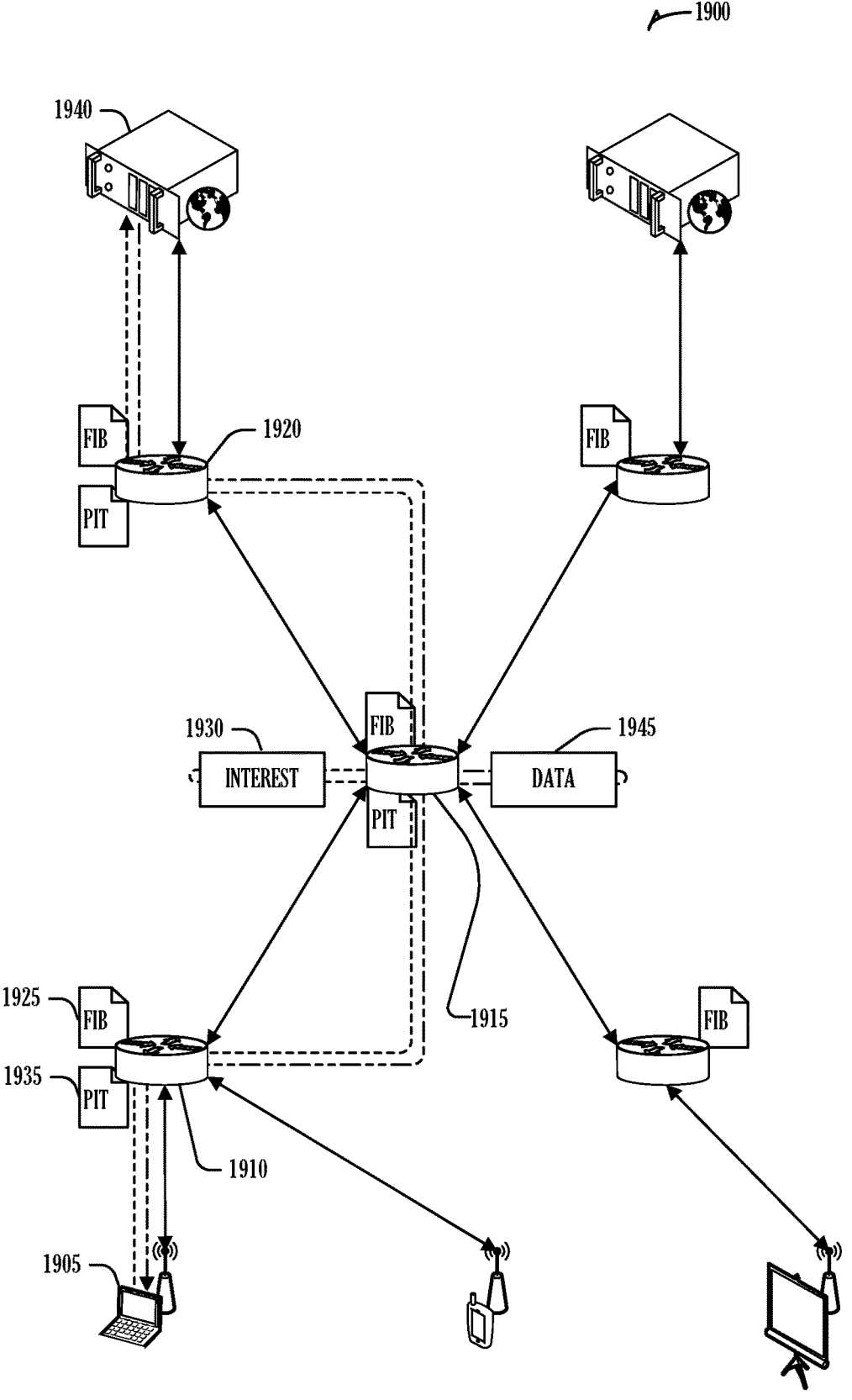
FIG. 19 illustrates an example information centric network (ICN), according to an embodiment.

FIG. 19 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1905 (e.g., subscriber) requests named content from the network itself. The content request may be called an interest and transmitted via an interest packet 1930. As the interest packet traverses network devices (e.g., network elements, routers, switches, hubs, etc.)—such as network elements 1910, 1915, and 1920—a record of the interest is kept, for example, in a pending interest table (PIT) at each network element. Thus, network element 1910 maintains an entry in its PIT 1935 for the interest packet 1930, network element 1915 maintains the entry in its PIT, and network element 1920 maintains the entry in its PIT.

When a device, such as publisher 1940, that has content matching the name in the interest packet 1930 is encountered, that device 1940 may send a data packet 1945 in response to the interest packet 1930. Typically, the data packet 1945 is tracked back through the network to the source (e.g., device 1905) by following the traces of the interest packet 1930 left in the network element PITs. Thus, the PIT 1935 at each network element establishes a trail back to the subscriber 1905 for the data packet 1945 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1930 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 1930 specifying "www.somedo-main.com or videos or v8675309." In an example, an expression may be used in matching by the ICN device. For example, the interest packet may specify "www.somedo-main.com or videos or v8675*" where '*' is a wildcard. Thus, any cached item or route that includes the data other than the wildcard will be matched.

Item matching involves matching the interest 1930 to data cached in the ICN element. Thus, for example, if the data 1945 named in the interest 1930 is cached in network element 1915, then the network element 1915 will return the data 1945 to the subscriber 1905 via the network element 1910. However, if the data 1945 is not cached at network element 1915, the network element 1915 routes the interest 1930 on (e.g., to network element 1920). To facilitate routing, the network elements may use a forwarding infor-mation base 1925 (FIB) to match named data to an interface (e.g., physical port) for the route. Thus, the FIB 1925 operates much like a routing table on a traditional network device.

In an example, additional meta-data may be attached to the interest packet 1930, the cached data, or the route (e.g., in the FIB 1925), to provide an additional level of matching. For example, the data name may be specified as "www-.somedomain.com or videos or v8675309," but also include a version number—or timestamp, time range, endorsement, etc. In this example, the interest packet 1930 may specify the desired name, the version number, or the version range. The matching may then locate routes or cached data matching the name and perform the additional comparison of meta-data or the like to arrive at an ultimate decision as to whether data or a route matches the interest packet 1930 for respec-tively responding to the interest packet 1930 with the data packet 1945 or forwarding the interest packet 1930.

ICN has advantages over host-based networking because the data segments are individually named. This enables aggressive caching throughout the network as a network element may provide a data packet 1930 in response to an interest 1930 as easily as an original author 1940. Accord-ingly, it is less likely that the same segment of the network will transmit duplicates of the same data requested by different devices.

Fine grained encryption is another feature of many ICN networks. A typical data packet 1945 includes a name for the data that matches the name in the interest packet 1930. Further, the data packet 1945 includes the requested data and may include additional information to filter similarly named data (e.g., by creation time, expiration time, version, etc.). To address malicious entities providing false information under the same name, the data packet 1945 may also encrypt its contents with a publisher key or provide a cryptographic hash of the data and the name. Thus, knowing the key (e.g., from a certificate of an expected publisher 1940) enables the recipient to ascertain whether the data is from that publisher 1940. This technique also facilitates the aggressive caching of the data packets 1945 throughout the network because each data packet 1945 is self-contained and secure. In contrast, many host-based networks rely on encrypting a connection between two hosts to secure communications. This may increase latencies while connections are being established and prevents data caching by hiding the data from the network elements.

Example ICN networks include content centric network-ing (CCN), as specified in the Internet Engineering Task Force (IETF) draft specifications for CCNx 0.x and CCN 1.x, and named data networking (NDN), as specified in the NDN technical report DND-0001.

Figure 20:
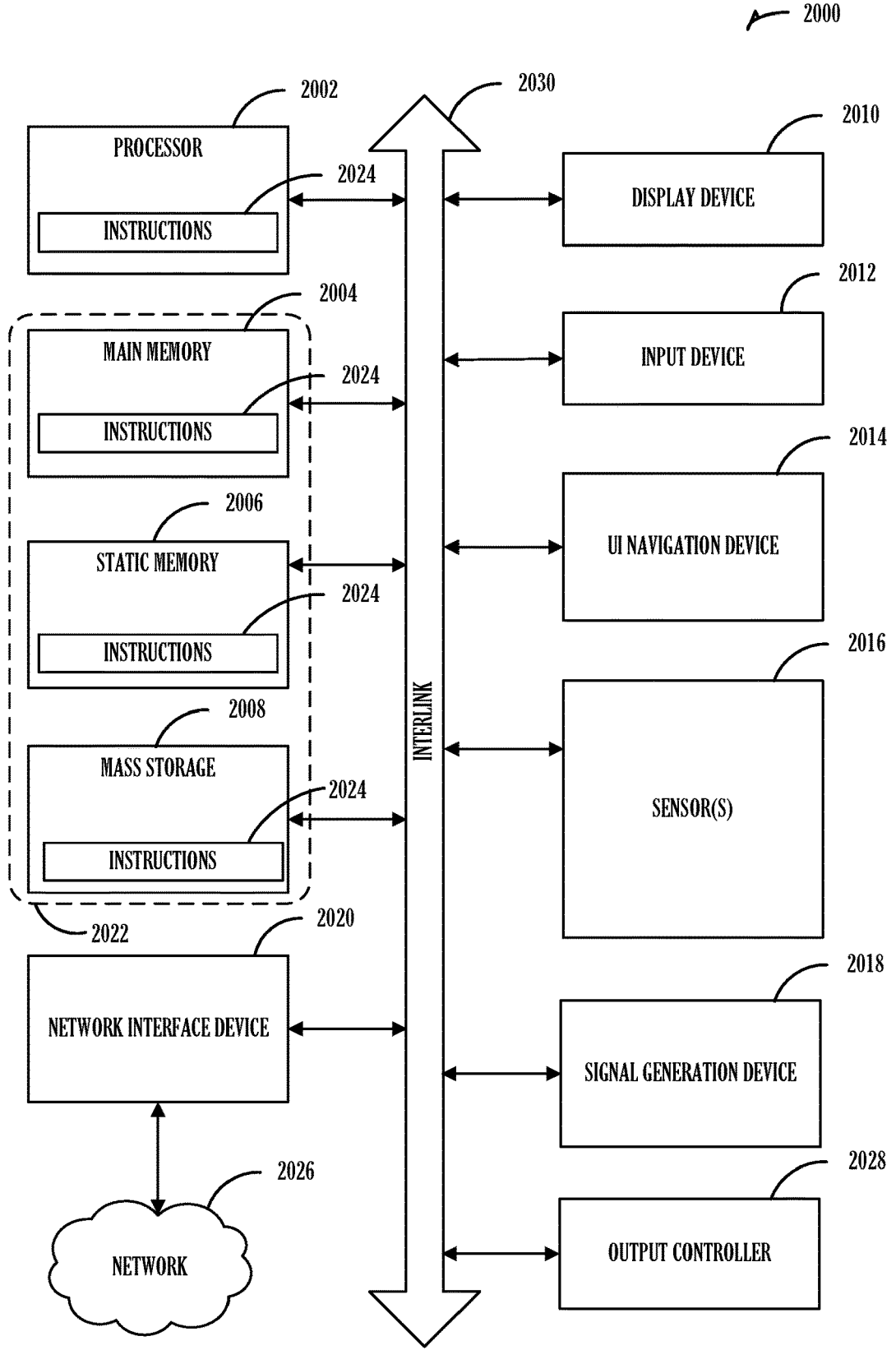
FIG. 20 is a block diagram illustrating an example of a machine upon which one or more embodiments may be implemented.

FIG. 20 illustrates a block diagram of an example machine 2000 upon which any one or more of the techniques (e.g., methodologies) discussed herein may perform. Examples, as described herein, may include, or may operate by, logic or a number of components, or mechanisms in the machine 2000. Circuitry (e.g., processing circuitry) is a collection of circuits implemented in tangible entities of the machine 2000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed par-ticles, etc.) to encode instructions of the specific operation. In connecting the physical components, the underlying electrical properties of a hardware constituent are changed, for example, from an insulator to a conductor or vice versa. The instructions enable embedded hardware (e.g., the execu-tion units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 2000 follow.

In alternative embodiments, the machine 2000 may oper-ate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet PC, a set-top box (STB), a personal digital assistant (PDA), a mobile telephone, a web appli-ance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2000 may include a hardware processor 2002 (e.g., a central processing unit (CPU), a graphics processing unit (GPU), a hardware processor core, or any combination thereof), a main memory 2004, a static memory (e.g., memory or storage for firmware, microcode, a basic-input-output (BIOS), unified extensible firmware interface (UEFI), etc.) 2006, and mass storage 2008 (e.g., hard drives, tape drives, flash storage, or other block devices) some or all of which may communicate with each other via an interlink (e.g., bus) 2030. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2008, a signal generation device 2018 (e.g., a speaker), a network interface device 2020, and one or more sensors 2016, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 2002, the main memory 2004, the static memory 2006, or the mass storage 2008 may be, or include, a machine readable medium 2022 on which is stored one or more sets of data structures or instructions 2024 (e.g., software) embodying or utilized by any one or more of the techniques or functions described herein. The instructions 2024 may also reside, completely or at least partially, within any of registers of the processor 2002, the main memory 2004, the static memory 2006, or the mass storage 2008 during execution thereof by the machine 2000. In an example, one or any combination of the hardware processor 2002, the main memory 2004, the static memory 2006, or the mass storage 2008 may constitute the machine readable media 2022. While the machine readable medium 2022 is illustrated as a single medium, the term "machine readable medium" may include a single medium or multiple media (e.g., a centralized or distributed database, and/or associated caches and servers) configured to store the one or more instructions 2024.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 2022 may be representative of the instructions 2024, such as instructions 2024 themselves or a format from which the instructions 2024 may be derived. This format from which the instructions 2024 may be derived may include source code, encoded instructions (e.g., in compressed or encrypted form), packaged instructions (e.g., split into multiple packages), or the like. The information representative of the instructions 2024 in the machine readable medium 2022 may be processed by processing circuitry into the instructions to implement any of the operations discussed herein. For example, deriving the instructions 2024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 2024.

In an example, the derivation of the instructions 2024 may include assembly, compilation, or interpretation of the information (e.g., by the processing circuitry) to create the instructions 2024 from some intermediate or preprocessed format provided by the machine readable medium 2022. The information, when provided in multiple parts, may be combined, unpacked, and modified to create the instructions 2024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 2024 may be further transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3 G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software. A transmission medium is a machine readable medium.

ADDITIONAL NOTES & EXAMPLES

Example 1 is a device for Information Centric Network (ICN) routing, the device comprising: a network interface to receive a routing packet, the routing packet including an ICN name and a routing metric, the routing packet being a link layer packet corresponding to a link of the device; and processing circuitry configured to: sort an entry for the link and name into a local routing data store based on the routing metric; and route an interest packet for the ICN name via the link based on the entry having a highest rank in the local routing data store.

In Example 2, the subject matter of Example 1 includes, wherein the local routing data store is a forwarding information base (FIB).

In Example 3, the subject matter of Examples 1-2 includes, wherein the routing packet conforms to an Intermediate System-Intermediate System (IS-IS) packet.

In Example 4, the subject matter of Example 3 includes, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

In Example 5, the subject matter of Examples 3-4 includes, wherein the contents of a System Identification field of the IS-IS packet include a unique node identifier of a node that produced the IS-IS packet.

In Example 6, the subject matter of Example 5 includes, wherein the unique node identifier is randomly generated.

In Example 7, the subject matter of Examples 5-6 includes, wherein the unique node identifier is an extended unique identifier from a network interface of the node that produced the IS-IS packet.

In Example 8, the subject matter of Examples 5-7 includes, wherein the unique node identifier is generated via a common algorithm from input parameters present on the node that produced the IS-IS packet.

In Example 9, the subject matter of Example 8 includes, wherein the algorithm is a hash.

In Example 10, the subject matter of Example 9 includes, wherein the input parameters include a serial number, a manufacturer identification, a stored secret, or a media access control (MAC) address.

In Example 11, the subject matter of Examples 5-10 includes, wherein the unique node identifier is six octets.

In Example 12, the subject matter of Examples 5-11 includes, wherein the name and the routing metric are encoded in type-length-value (TLV) fields in the IS-IS packet.

In Example 13, the subject matter of Example 12 includes, wherein the TLV fields are arranged in multiple levels, wherein an outer level TLV field indicates that a contained value includes individual ICN names, and wherein an inner level TLV field includes the routing metric for the ICN name.

In Example 14, the subject matter of Examples 3-13 includes, wherein the routing metric is one of a set of routing metrics, the set of routing metrics including: a default metric; a delay metric; an expense metric; or an error metric.

In Example 15, the subject matter of Examples 3-14 includes, wherein, to sort the entry for the link-and-name into the local routing data store based on the routing metric, the processing circuitry calculates a Multiple-Source Shortest Path (MSSP) score for the entry from the metric and other entries corresponding to the name, wherein multiple entries have an equivalent MSSP score for the name.

In Example 16, the subject matter of Examples 1-15 includes, wherein the routing packet is Open Shortest Path First (OSPF) packet.

In Example 17, the subject matter of Example 16 includes, wherein the OSPF packet is one of a HELLO packet, a database description packet, a link-state request packet, link state update packet, or a link state acknowledgement packet.

In Example 18, the subject matter of Examples 16-17 includes, wherein an Instance ID of 128 indicates a base ICN name/prefix address family (AF).

In Example 19, the subject matter of Examples 16-18 includes, an Instance ID in the range of 129-159 indicates an ICN name/prefix AF dependent upon local policy.

In Example 20, the subject matter of Examples 16-19 includes, wherein a link state advertisement (LSA) encodes an ICN name/prefix using a sixteen bit prefix PrefixLength field, without a PrefixOptions field.

In Example 21, the subject matter of Example 20 includes, wherein the LSA is an Inter-Area-Prefix-LSA, an AS-external-LSA, a NSSA-LSA, a Link-LSA, or an Intra-Area-Prefix LSA.

In Example 22, the subject matter of Examples 16-21 includes, wherein a name structure for the ICN name is encoded in a name structure field of the OSPF packet.

Example 23 is a method for Information Centric Network (ICN) routing, the method comprising: receiving, at an ICN node, a routing packet, the routing packet including an ICN name and a routing metric, the routing packet being a link layer packet corresponding to a link of the ICN node; sorting an entry for the link and name into a local routing data store based on the routing metric; and routing an interest packet for the ICN name via the link based on the entry having a highest rank in the local routing data store.

In Example 24, the subject matter of Example 23 includes, wherein the local routing data store is a forwarding information base (FIB).

In Example 25, the subject matter of Examples 23-24 includes, wherein the routing packet conforms to an Intermediate System-Intermediate System (IS-IS) packet.

In Example 26, the subject matter of Example 25 includes, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

In Example 27, the subject matter of Examples 25-26 includes, wherein the contents of a System Identification field of the IS-IS packet include a unique node identifier of a node that produced the IS-IS packet.

In Example 28, the subject matter of Example 27 includes, wherein the unique node identifier is randomly generated.

In Example 29, the subject matter of Examples 27-28 includes, wherein the unique node identifier is an extended unique identifier from a network interface of the node that produced the IS-IS packet.

In Example 30, the subject matter of Examples 27-29 includes, wherein the unique node identifier is generated via a common algorithm from input parameters present on the node that produced the IS-IS packet.

In Example 31, the subject matter of Example 30 includes, wherein the algorithm is a hash.

In Example 32, the subject matter of Example 31 includes, wherein the input parameters include a serial number, a manufacturer identification, a stored secret, or a media access control (MAC) address.

In Example 33, the subject matter of Examples 27-32 includes, wherein the unique node identifier is six octets.

In Example 34, the subject matter of Examples 27-33 includes, wherein the name and the routing metric are encoded in type-length-value (TLV) fields in the IS-IS packet.

In Example 35, the subject matter of Example 34 includes, wherein the TLV fields are arranged in multiple levels, wherein an outer level TLV field indicates that a contained value includes individual ICN names, and wherein an inner level TLV field includes the routing metric for the ICN name.

In Example 36, the subject matter of Examples 25-35 includes, wherein the routing metric is one of a set of routing metrics, the set of routing metrics including: a default metric; a delay metric; an expense metric; or an error metric.

In Example 37, the subject matter of Examples 25-36 includes, wherein sorting the entry for the link-and-name into the local routing data store based on the routing metric includes calculating a Multiple-Source Shortest Path (MSSP) score for the entry from the metric and other entries corresponding to the name, wherein multiple entries have an equivalent MSSP score for the name.

In Example 38, the subject matter of Examples 23-37 includes, wherein the routing packet is Open Shortest Path First (OSPF) packet.

In Example 39, the subject matter of Example 38 includes, wherein the OSPF packet is one of a HELLO packet, a database description packet, a link-state request packet, link state update packet, or a link state acknowledgement packet.

In Example 40, the subject matter of Examples 38-39 includes, wherein an Instance ID of 128 indicates a base ICN name/prefix address family (AF).

In Example 41, the subject matter of Examples 38-40 includes, an Instance ID in the range of 129-159 indicates an ICN name/prefix AF dependent upon local policy.

In Example 42, the subject matter of Examples 38-41 includes, wherein a link state advertisement (LSA) encodes an ICN name/prefix using a sixteen bit prefix PrefixLength field, without a PrefixOptions field.

In Example 43, the subject matter of Example 42 includes, wherein the LSA is an Inter-Area-Prefix-LSA, an AS-external-LSA, a NSSA-LSA, a Link-LSA, or an Intra-Area-Prefix LSA.

In Example 44, the subject matter of Examples 38-43 includes, wherein a name structure for the ICN name is encoded in a name structure field of the OSPF packet.

Example 45 is at least one machine readable medium including instructions for Information Centric Network (ICN) routing, the instructions, when executed by processing circuitry, cause the processing circuitry to perform operations comprising: receiving, at an ICN node, a routing packet, the routing packet including an ICN name and a routing metric, the routing packet being a link layer packet corresponding to a link of the ICN node; sorting an entry for the link and name into a local routing data store based on the routing metric; and routing an interest packet for the ICN name via the link based on the entry having a highest rank in the local routing data store.

In Example 46, the subject matter of Example 45 includes, wherein the local routing data store is a forwarding information base (FIB).

In Example 47, the subject matter of Examples 45-46 includes, wherein the routing packet conforms to an Intermediate System-Intermediate System (IS-IS) packet.

In Example 48, the subject matter of Example 47 includes, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

In Example 49, the subject matter of Examples 47-48 includes, wherein the contents of a System Identification field of the IS-IS packet include a unique node identifier of a node that produced the IS-IS packet.

In Example 50, the subject matter of Example 49 includes, wherein the unique node identifier is randomly generated.

In Example 51, the subject matter of Examples 49-50 includes, wherein the unique node identifier is an extended unique identifier from a network interface of the node that produced the IS-IS packet.

In Example 52, the subject matter of Examples 49-51 includes, wherein the unique node identifier is generated via a common algorithm from input parameters present on the node that produced the IS-IS packet.

In Example 53, the subject matter of Example 52 includes, wherein the algorithm is a hash.

In Example 54, the subject matter of Example 53 includes, wherein the input parameters include a serial number, a manufacturer identification, a stored secret, or a media access control (MAC) address.

In Example 55, the subject matter of Examples 49-54 includes, wherein the unique node identifier is six octets.

In Example 56, the subject matter of Examples 49-55 includes, wherein the name and the routing metric are encoded in type-length-value (TLV) fields in the IS-IS packet.

In Example 57, the subject matter of Example 56 includes, wherein the TLV fields are arranged in multiple levels, wherein an outer level TLV field indicates that a contained value includes individual ICN names, and wherein an inner level TLV field includes the routing metric for the ICN name.

In Example 58, the subject matter of Examples 47-57 includes, wherein the routing metric is one of a set of routing metrics, the set of routing metrics including: a default metric; a delay metric; an expense metric; or an error metric.

In Example 59, the subject matter of Examples 47-58 includes, wherein sorting the entry for the link-and-name into the local routing data store based on the routing metric includes calculating a Multiple-Source Shortest Path (MSSP) score for the entry from the metric and other entries corresponding to the name, wherein multiple entries have an equivalent MSSP score for the name.

In Example 60, the subject matter of Examples 45-59 includes, wherein the routing packet is Open Shortest Path First (OSPF) packet.

In Example 61, the subject matter of Example 60 includes, wherein the OSPF packet is one of a HELLO packet, a database description packet, a link-state request packet, link state update packet, or a link state acknowledgement packet.

In Example 62, the subject matter of Examples 60-61 includes, wherein an Instance ID of 128 indicates a base ICN name/prefix address family (AF).

In Example 63, the subject matter of Examples 60-62 includes, an Instance ID in the range of 129-159 indicates an ICN name/prefix AF dependent upon local policy.

In Example 64, the subject matter of Examples 60-63 includes, wherein a link state advertisement (LSA) encodes an ICN name/prefix using a sixteen bit prefix PrefixLength field, without a PrefixOptions field.

In Example 65, the subject matter of Example 64 includes, wherein the LSA is an Inter-Area-Prefix-LSA, an AS-external-LSA, a NSSA-LSA, a Link-LSA, or an Intra-Area-Prefix LSA.

In Example 66, the subject matter of Examples 60-65 includes, wherein a name structure for the ICN name is encoded in a name structure field of the OSPF packet.

Example 67 is a system for Information Centric Network (ICN) routing, the system comprising: means for receiving, at an ICN node, a routing packet, the routing packet including an ICN name and a routing metric, the routing packet being a link layer packet corresponding to a link of the ICN node; means for sorting an entry for the link and name into a local routing data store based on the routing metric; and means for routing an interest packet for the ICN name via the link based on the entry having a highest rank in the local routing data store.

In Example 68, the subject matter of Example 67 includes, wherein the local routing data store is a forwarding information base (FIB).

In Example 69, the subject matter of Examples 67-68 includes, wherein the routing packet conforms to an Intermediate System-Intermediate System (IS-IS) packet.

In Example 70, the subject matter of Example 69 includes, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

In Example 71, the subject matter of Examples 69-70 includes, wherein the contents of a System Identification field of the IS-IS packet include a unique node identifier of a node that produced the IS-IS packet.

In Example 72, the subject matter of Example 71 includes, wherein the unique node identifier is randomly generated.

In Example 73, the subject matter of Examples 71-72 includes, wherein the unique node identifier is an extended unique identifier from a network interface of the node that produced the IS-IS packet.

In Example 74, the subject matter of Examples 71-73 includes, wherein the unique node identifier is generated via a common algorithm from input parameters present on the node that produced the IS-IS packet.

In Example 75, the subject matter of Example 74 includes, wherein the algorithm is a hash.

In Example 76, the subject matter of Example 75 includes, wherein the input parameters include a serial number, a manufacturer identification, a stored secret, or a media access control (MAC) address.

In Example 77, the subject matter of Examples 71-76 includes, wherein the unique node identifier is six octets.

In Example 78, the subject matter of Examples 71-77 includes, wherein the name and the routing metric are encoded in type-length-value (TLV) fields in the IS-IS packet.

In Example 79, the subject matter of Example 78 includes, wherein the TLV fields are arranged in multiple levels, wherein an outer level TLV field indicates that a contained value includes individual ICN names, and wherein an inner level TLV field includes the routing metric for the ICN name.

In Example 80, the subject matter of Examples 69-79 includes, wherein the routing metric is one of a set of routing metrics, the set of routing metrics including: a default metric; a delay metric; an expense metric; or an error metric.

In Example 81, the subject matter of Examples 69-80 includes, wherein the means for sorting the entry for the link-and-name into the local routing data store based on the routing metric include means for calculating a Multiple-Source Shortest Path (MSSP) score for the entry from the metric and other entries corresponding to the name, wherein multiple entries have an equivalent MSSP score for the name.

In Example 82, the subject matter of Examples 67-81 includes, wherein the routing packet is Open Shortest Path First (OSPF) packet.

In Example 83, the subject matter of Example 82 includes, wherein the OSPF packet is one of a HELLO packet, a database description packet, a link-state request packet, link state update packet, or a link state acknowledgement packet.

In Example 84, the subject matter of Examples 82-83 includes, wherein an Instance ID of 128 indicates a base ICN name/prefix address family (AF).

In Example 85, the subject matter of Examples 82-84 includes, an Instance ID in the range of 129-159 indicates an ICN name/prefix AF dependent upon local policy.

In Example 86, the subject matter of Examples 82-85 includes, wherein a link state advertisement (LSA) encodes an ICN name/prefix using a sixteen bit prefix PrefixLength field, without a PrefixOptions field.

In Example 87, the subject matter of Example 86 includes, wherein the LSA is an Inter-Area-Prefix-LSA, an AS-external-LSA, a NSSA-LSA, a Link-LSA, or an Intra-Area-Prefix LSA.

In Example 88, the subject matter of Examples 82-87 includes, wherein a name structure for the ICN name is encoded in a name structure field of the OSPF packet.

Example 89 is at least one machine-readable medium including instructions that, when executed by processing circuitry, cause the processing circuitry to perform operations to implement of any of Examples 1-88.

Example 90 is an apparatus comprising means to implement of any of Examples 1-88.

Example 91 is a system to implement of any of Examples 1-88.

Example 92 is a method to implement of any of Examples 1-88.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for Information Centric Network (ICN) routing, the device comprising:

a network interface to receive a routing packet, the routing packet including an ICN name and a routing metric, the routing packet being a link layer packet corresponding to a link of the device, the link corresponding to the network interface, wherein the routing packet conforms to an Intermediate System-Intermediate System (IS-IS) packet, wherein contents of a System Identification field of the IS-IS packet include a unique node identifier of a node that produced the IS-IS packet, wherein the ICN name and the routing metric are encoded in type-length-value (TLV) fields in the IS-IS packet, and wherein the TLV fields are arranged in multiple levels, wherein an outer level TLV field indicates that a contained value includes individual ICN names, and wherein an inner level TLV field includes the routing metric for the ICN name; and processing circuitry configured to:

sort an entry for the link and the ICN name into a local routing data store based on the routing metric; and route an interest packet for the ICN name via the link based on the entry having a highest rank in the local routing data store.

2. The device of claim 1, wherein the unique node identifier is generated via a common algorithm from input parameters present on the node that produced the IS-IS packet.

3. The device of claim 2, wherein the algorithm is a hash, and wherein the input parameters include a serial number, a manufacturer identification, a stored secret, or a media access control (MAC) address.

4. The device of claim 1, wherein the routing metric is one of a set of routing metrics, the set of routing metrics including:

a default metric;

a delay metric;

an expense metric; or an error metric.

5. The device of claim 1, wherein, to sort the entry for the the link and the ICN name into the local routing data store based on the routing metric, the processing circuitry calculates a Multiple-Source Shortest Path (MSSP) score for the entry from the metric and other entries corresponding to the name, wherein multiple entries have an equivalent MSSP score for the name.

6. The device of claim 1, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

7. The device of claim 1, wherein the unique node identifier is randomly generated.

8. The device of claim 1, wherein the unique node identifier is an extended unique identifier from a network interface of the node that produced the IS-IS packet.

9. A method for Information Centric Network (ICN) routing, the method comprising:

receiving, at an ICN node, a routing packet, the routing packet including an ICN name and a routing metric, the routing packet being a link layer packet corresponding to a link of the ICN node, wherein the routing packet conforms to an Intermediate System-Intermediate System (IS-IS) packet, wherein contents of a System Identification field of the IS-IS packet include a unique node identifier of a node that produced the IS-IS packet, wherein the ICN name and the routing metric are encoded in type-length-value (TLV) fields in the IS-IS packet, and wherein the TLV fields are arranged in multiple levels, wherein an outer level TLV field indicates that a contained value includes individual ICN names, and wherein an inner level TLV field includes the routing metric for the ICN name;

sorting an entry for the link and the ICN name into a local routing data store based on the routing metric; and routing an interest packet for the ICN name via the link based on the entry having a highest rank in the local routing data store.

10. The method of claim 2, wherein the unique node identifier is generated via a common algorithm from input parameters present on the node that produced the IS-IS packet.

11. The method of claim 10, wherein the algorithm is a hash, and wherein the input parameters include a serial number, a manufacturer identification, a stored secret, or a media access control (MAC) address.

12. The method of claim 9, wherein the routing metric is one of a set of routing metrics, the set of routing metrics including:

a default metric;

a delay metric;

an expense metric; or an error metric.

13. The method of claim 9, wherein sorting the entry for the link and name link and the ICN name into the local routing data store based on the routing metric includes calculating a Multiple-Source Shortest Path (MSSP) score for the entry from the metric and other entries corresponding to the name, wherein multiple entries have an equivalent MSSP score for the name.

14. The method of claim 9, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

15. The method of claim 9, wherein the unique node identifier is randomly generated.

16. The method of claim 9, wherein the unique node identifier is an extended unique identifier from a network interface of the node that produced the IS-IS packet.

17. At least one non-transitory machine readable medium including instructions for Information Centric Network (ICN) routing, the instructions, when executed by processing circuitry, cause the processing circuitry to perform operations comprising:

receiving, at an ICN node, a routing packet, the routing packet including an ICN name and a routing metric, the routing packet being a link layer packet corresponding to a link of the ICN node, wherein the routing packet conforms to an Intermediate System-Intermediate System (IS-IS) packet, wherein contents of a System Identification field of the IS-IS packet include a unique node identifier of a node that produced the IS-IS packet, wherein the ICN name and the routing metric are encoded in type-length-value (TLV) fields in the IS-IS packet, and wherein the TLV fields are arranged in multiple levels, wherein an outer level TLV field indicates that a contained value includes individual ICN names, and wherein an inner level TLV field includes the routing metric for the ICN name;

sorting an entry for the link and name into a local routing data store based on the routing metric; and routing an interest packet for the ICN name via the link based on the entry having a highest rank in the local routing data store.

18. The at least one non-transitory machine readable medium of claim 17, wherein the unique node identifier is generated via a common algorithm from input parameters present on the node that produced the IS-IS packet.

19. The at least one non-transitory machine readable medium of claim 18, wherein the algorithm is a hash, and wherein the input parameters include a serial number, a manufacturer identification, a stored secret, or a media access control (MAC) address.

20. The at least one non-transitory machine readable medium of claim 17, wherein the routing metric is one of a set of routing metrics, the set of routing metrics including:

a default metric;

a delay metric;

an expense metric; or an error metric.

21. The at least one non-transitory machine readable medium of claim 17, wherein sorting the entry for the link and the ICN name into the local routing data store based on the routing metric includes calculating a Multiple-Source Shortest Path (MSSP) score for the entry from the metric and other entries corresponding to the name, wherein multiple entries have an equivalent MSSP score for the name.

22. The at least one non-transitory machine readable medium of claim 17, wherein the IS-IS packet is one of a local area network (LAN) level one (L1) HELLO packet, a LAN level two (L2) HELLO packet, a point-to-point HELLO packet, an L1 Link State Packet Data Unit (PDU) (LSP) packet, an L2 LSP packet, an L1 Complete Sequence Number PDU (SNP), an L2 Complete SNP, an L1 Partial SNP, or an L2 Partial SNP.

23. The at least one non-transitory machine readable medium of claim 17, wherein the unique node identifier is randomly generated.

24. The at least one non-transitory machine readable medium of claim 17, wherein the unique node identifier is an extended unique identifier from a network interface of the node that produced the IS-IS packet.

* * * * *